United States Patent [19]

Minh

[11] Patent Number: 5,215,946

[45] Date of Patent: Jun. 1, 1993

[54] PREPARATION OF POWDER ARTICLES HAVING IMPROVED GREEN STRENGTH

[75] Inventor: Nguyen Q. Minh, Fountain Valley, Calif.

[73] Assignee: Allied-Signal, Inc., Morris Township, Morris County, N.J.

[21] Appl. No.: 740,345

[22] Filed: Aug. 5, 1991

[51] Int. Cl.$^5$ ............................................. C04B 35/58
[52] U.S. Cl. ....................................... 501/97; 264/63
[58] Field of Search ............... 428/209, 424.6; 501/94, 501/97, 98; 525/58; 264/63

[56] References Cited

U.S. PATENT DOCUMENTS

| | | | |
|---|---|---|---|
| 3,532,522 | 10/1970 | Richards | 106/45 |
| 3,625,733 | 12/1971 | Mansur | 117/46 |
| 3,782,989 | 1/1974 | Mansur | 106/285 |
| 3,794,707 | 2/1974 | O'Neill et al. | 264/56 |
| 3,953,562 | 4/1976 | Hait et al. | 264/63 |
| 4,192,064 | 3/1980 | Kennedy | 29/631 |
| 4,521,357 | 6/1985 | Kernion et al. | 264/63 |
| 4,564,485 | 1/1986 | Eschner et al. | 264/30 |
| 4,585,500 | 4/1986 | Minjolle et al. | 156/89 |
| 4,638,029 | 1/1987 | Meschke et al. | 524/430 |
| 4,767,479 | 8/1988 | Ferguson et al. | 156/89 |
| 4,804,562 | 2/1989 | Ferguson et al. | 427/140 |
| 4,830,994 | 5/1989 | Schuetz | 501/127 |
| 4,894,194 | 1/1990 | Janney | 264/109 |
| 4,897,301 | 1/1990 | Uno et al. | 428/209 |
| 4,968,460 | 11/1990 | Thompson et al. | 264/63 |
| 5,026,771 | 6/1991 | Dupont et al. | 525/50 |
| 5,053,455 | 10/1991 | Kroggel et al. | 525/58 |
| 5,073,439 | 12/1991 | Hashimoto et al. | 428/328 |

Primary Examiner—Mark L. Bell
Assistant Examiner—Alan Wright
Attorney, Agent, or Firm—R. A. Walsh

[57] ABSTRACT

A method for preparing an article from a powder includes the step of providing a partially consolidated mixture of a solid powder and an organic binder system. The partially consolidated mixture is contacted with a stiffening solution comprising a stiffening agent that effects at least partial cross-linking of the organic binder system, and a solvent that dissolves the stiffening agent but not the organic binder system. The binder system is thereafter removed, and the article sintered.

13 Claims, 1 Drawing Sheet

PREPARATION OF POWDER ARTICLES HAVING IMPROVED GREEN STRENGTH

BACKGROUND OF THE INVENTION

This invention relates to the fabrication of ceramic articles, and, more particularly, to the preparation of articles having improved green strength.

Many techniques have been developed to fabricate ceramic materials into useful articles. The most commonly used is the particulate approach. This process involves compaction of a powder of the ceramic or suitable precursors, and densification at elevated temperature. The major shape forming processes based on the particulate approach are pressing (e.g., uniaxial, isostatic, hot isostatic), slip casting (e.g., vacuum casting, gel casting), tape casting (e.g., doctor blade), and plastic forming (e.g., extrusion, injection molding, rolling).

In many cases, an organic additive, termed a "binder", is used to assist in shape forming of the partially compressed but unfired ceramic article, termed a "green state" compact. The binder is mixed with the ceramic powder, and the mixture is compressed to create the green state compact that resembles the final article but is typically somewhat oversize to account for subsequent shrinkage. The green state compact is thereafter heated to remove the binder by vaporization, a process termed "burnout", and cause the ceramic particles to bond together during densification, a process termed "sintering".

Without the aid of a binder, it is almost impossible to form ceramic powders into suitable green states, because the ceramic powders do not cold bond together. The organic binders function as temporary bonding media for ceramic bodies to provide green strength for handling, inspection, and green machining. Also, the binder imparts other required properties to a ceramic batch such as die lubrication and plasticity.

A binder system used for ceramic fabrication is typically composed of two or more components: a binder, a plasticizer, and other processing aids such as a dispersant and a surfactant. A binder is generally a high molecular weight polymer whose function is to coat the ceramic particles to provide flexibility and integrity to the green state compacts. The binder determines the general range of final binder system properties. A plasticizer is a small- to medium-sized organic molecule that decreases cross-linking among binder molecules. The plasticizer is used to improve the plasticity or fluidity of the ceramic-binder mixture. The other processing aids are minor organic additives used mainly to improve ceramic powder processing. For example, dispersants in binder systems are polymers that aid in dispersion of ceramic particles. Surfactants are used to enhance the wetting characteristics between the binder and the ceramic particles.

The criteria for selection of binders include considerations such as (1) conferring sufficient flexibility and green strength upon the ceramic powder, (2) wetting the powder to aid dispersion, (3) leaving a minimal amount of residue after removal, and (4) having an adequate storage life. The criteria for selection of plasticizers include (1) not reacting but forming a softened mixture with the binder, and (2) having low volatility. Binder systems may be broadly classified as thermoplastic or thermosetting. Thermoplastic polymers can be softened by heating to moderate temperatures, whereas thermosetting materials are hardened by heating. Selection of the binder system and its composition is dependent on the type of forming process to be conducted and the shape of the ceramic article to be fabricated.

Among the various forming techniques mentioned earlier, tape casting and plastic forming processes have been used extensively for fabrication of multilayer ceramic structures and intricate shapes. Binder systems used in tape casting and plastic forming processes are generally selected to be thermoplastic. In tape casting, which has been developed to fabricate thin ceramic layers, the use of a thermoplastic binder allows layers to be bonded together by lamination. In plastic forming, the binder thermoplasticity allows a dough-like mixture of the ceramic powder and additives with required formability to be produced. In tape casting and plastic forming, fabrication of a ceramic structure often involves forming the structure in the green state followed by firing the green structure at elevated temperatures to form a sintered rigid body.

A major difficulty experienced in tape casting and plastic forming processes is removing the organic material during firing. Binder removal or burnout becomes increasingly important as the size and complexity of the fired structures increase. The binder burnout phase is critical in that gases must be given sufficient time to escape the structure without causing mechanical damage such as blistering or delamination. During the burnout phase, the compact must retain sufficient strength to prevent warping, distortion, or slumping, even though the binder is being removed.

Thus, one requirement of the binder system is that it should confer sufficient plasticity upon the compact to permit green state forming. However, once the ceramic structure is formed into the required shape, the binder should impart sufficient rigidity during the initial stage of binder burnout. In general, thermoplastic binders initially soften then vaporize when heated. During the softening stage of binder extraction, thermoplastic binders may not be stiff enough to support the ceramic structure as its size, weight, and complexity increase, resulting in slumping, collapsing, or deforming before sintering is complete.

There is therefore an ongoing need for an improved approach for achieving a sintered article with a desired structure. The present invention fulfills this need, and further provides related advantages.

SUMMARY OF THE INVENTION

The present invention provides a method of preparing a ceramic article having improved green strength as compared with prior approaches, and articles prepared by the method. The improved strength reduces deformation of the article in the green state, both before and during firing. The result is a reduction in the shape change of the final sintered article relative to that of the green compact. The method is controllable, and can be used with large or small compacts having intricate structures.

In accordance with the invention, a method for preparing an article from a powder includes the step of providing a partially consolidated mixture of a solid powder and an organic binder system. The partially consolidated mixture is contacted with a stiffening solution comprising a stiffening agent that effects at least partial cross-linking of the organic binder system, and a solvent that dissolves the stiffening agent but not the organic binder system. The solvent is thereafter removed, and the article fired to effect sintering.

The invention thus provides a method of stiffening thermoplastic binders after green state forming of intricate ceramic structures. It is especially useful for preparing articles having internal porosity or structures with required channels or passages. The unfired structures are treated with the solution containing a solvent and a stiffening agent, typically by immersing the unfired structure in the solution. This approach of solution treatment by a stiffening solution allows penetration of the stiffening agent to all parts of even a complex structure. The solvent must form a miscible solution with the stiffening agent, but not dissolve the binder. The stiffening agent reacts with the binder to harden it, as by crosslinking. The degree of hardening is controllable through selection of the stiffening agent and its concentration in the solution.

The present approach provides an important advance in the art of production of articles from powders. Other features and advantages will be apparent from the following more detailed description of the preferred embodiments, taken in conjunction with the accompanying drawing, which illustrates, by way of example, the principles of the invention.

DETAILED DESCRIPTION OF THE INVENTION

Figure 1:
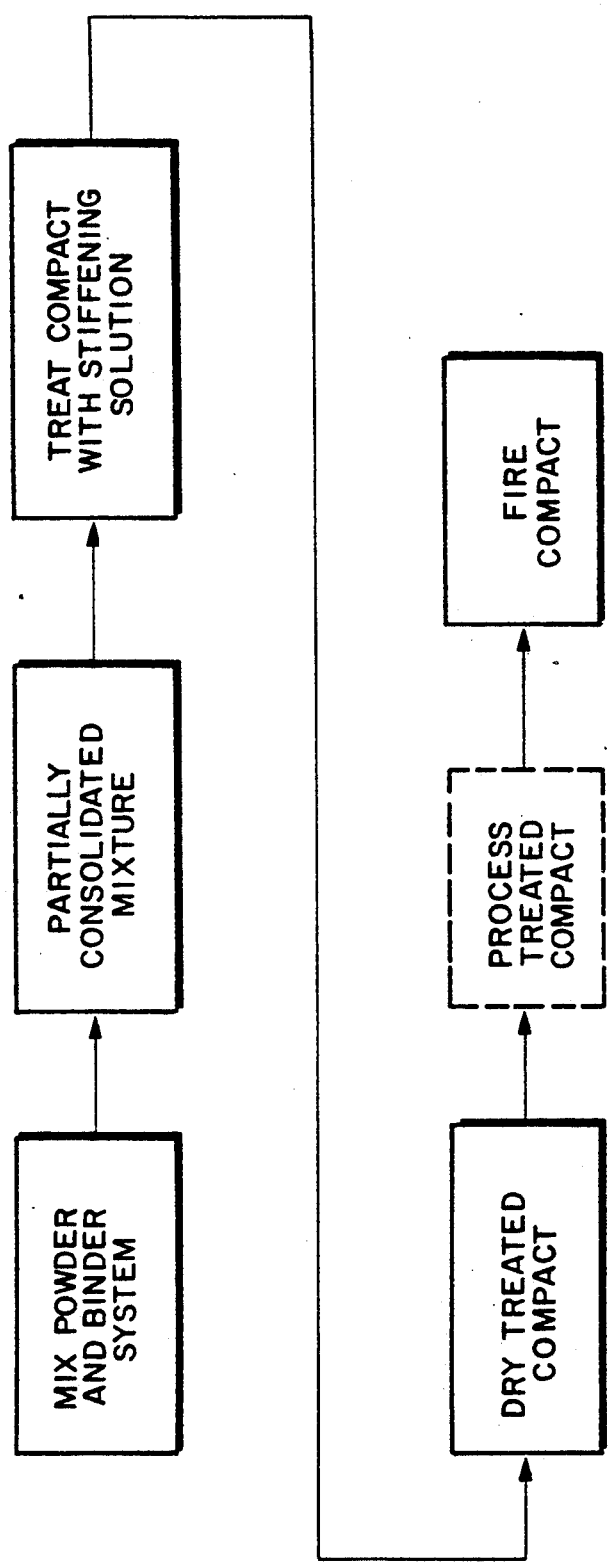
FIG. 1 is a flow chart of a preferred embodiment of the method of the invention.

In a preferred method according to the invention, as illustrated in FIG. 1, ceramic or other powder is mixed with the binder system. There is no limitation on the type of powder used with the approach of the present invention, although ceramic powders are presently of most interest and are preferred. In one approach, the mixing is accomplished in a dispersive mixer. The heat resulting from the friction in the mixing step softens the binder system to form a dough-like plastic mass. In another approach, a less viscous mixture is prepared using a solvent. The proper viscosity is selected for the particular consolidation procedure to be used. The viscosity of the mixture depends upon the relative amounts of the powder and the binder, the presence of a solvent that tends to make the mixture more fluid, and the chemical composition of the binder system. The selection of the particular characteristics of the mixture, and the techniques by which those characteristics are achieved, are known and are within the skill of those in each particular field.

The mixture of powder and binder system is partially consolidated by any of many methods. For mixtures with a higher viscosity, more dough-like consistency, partial consolidation may be by extrusion, injection molding, compression molding, or rolling, for example. In extrusion, the mixture is forced through an orifice into a narrow passageway which leads to a shaped extrusion tool. In compression molding, the mass is placed between the platens of a shaped die and uniaxial pressure is applied until the mass deforms to the shape of the die cavity. In rolling, the mass is passed between two counter-rotating rolls and pressed to a thickness equivalent to the spacing of the rolls. The resulting tapes can be stacked or bonded to form parts.

Alternatively, where the mixture is less viscous and more like a liquid in consistency, partial consolidation is achieved by tape casting, for example. The fluid mixture is spread on a flat surface to a controlled thickness by the knife edge of a doctor blade and the solvent is allowed to dry so that the mixture partially consolidates. The resulting tape, containing powder and the binder system, is flexible. It can be stripped from the casting surface and then laminated, compression molded, or otherwise formed prior to firing. Multilayer tapes can be fabricated by sequentially casting one layer on top of another until the multilayer stack is complete. The resulting tapes can then be further stacked or bonded to form the required green structures.

The green structure or compact formed as described above is treated with a stiffening solution prior to firing. The solution stiffens the thermoplastic binder to improve its resistance of slumping, collapsing, or deforming during firing. This treatment occurs after the step of partially consolidating, because the increased strength of the mixture produced by the stiffening treatment would make the partial consolidation step more difficult.

The stiffening solution contains a solvent and a stiffening agent. The solvent must form a miscible solution with the stiffening agent, but must not dissolve the binder system already in place in the mixture. Examples of solvents that are suitable for most stiffening agents include hexane, toluene, and benzene.

The stiffening agent must be capable of hardening the binder, typically by crosslinking. The selection of a particular stiffening agent reactive with a particular binder to harden the binder will be known to those skilled in the art who apply the approach discussed herein, but generally depends upon the reactivity of the binder. For example, the free hydroxyl groups in polyvinyl acetal binders present a point of chemical reactivity through which the polymer may be crosslinked. Any chemical reagent which reacts with hydroxyl groups will crosslink this binder. Isocyanates, for example, react with the polyvinyl acetals according to the following reaction:

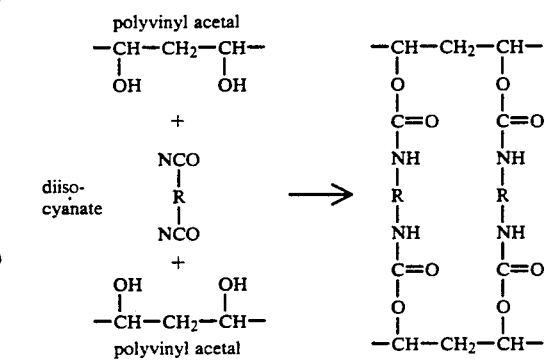

Similarly, dialdehydes can crosslink the polyvinyl acetals by reacting with the hydroxyl group according to the following reaction:

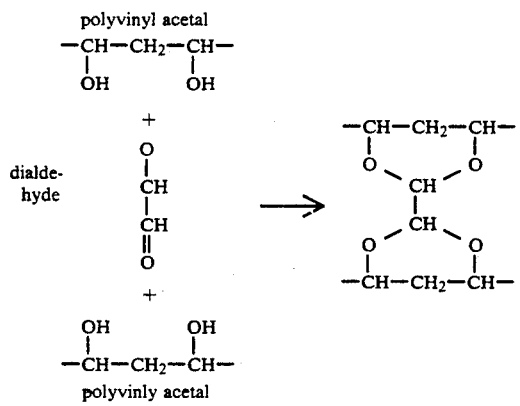

The following table lists stiffening agents for several common thermoplastic binder systems:

STIFFENING AGENTS

| Binder System | Stiffening Agent |
| --- | --- |
| Polyvinyl Acetal | Diisocyanates, glyoxal, 2-methoxy-4-methylphenol |
| Polyethylene | Peroxides (e.g., dicumyl peroxide, acetylenic peroxides) |
| Polyvinyl Carbonate | Peroxides |
| ABS (Acrylonitrile, Butadiene, Styrene) | Polyisocyanates N-methylol derivatives |

The stiffening solution is prepared by dissolving the appropriate stiffening agent in the selected solvent. The concentration of the stiffening agent preferably ranges from about 0.5 to about 5 volume percent of the solution, most preferably about 2 volume percent.

The compact is treated with the stiffening solution in any appropriate manner. A preferred approach is to immerse the compact into the solution for a period of time sufficiently long that the solution can penetrate throughout the compact. One advantage of the present processing is that the solution, and hence the stiffening agent, can penetrate to all parts of simple or complex structures. The treatment time depends upon the thickness and size of the compact, but 8-10 hours has been found sufficient in most instances.

After the compact is treated with the stiffening solution, the compact is removed from the stiffening solution and dried to remove the solvent of the stiffening solution. Preferably, the compact is dried in a flowing air stream at ambient temperature for a period of time sufficient to permit all of the solvent to evaporate. The drying process can be accelerated by heating the compact or removing the solvent with an applied vacuum. However, care must be taken when using accelerated drying to avoid the formation of gas bubbles in the compact.

The treated and dried compact may be further processed at this time prior to firing and sintering, if desired. The processing does not ordinarily involve further reforming of the overall shape of the compact, but instead can be in the nature of machining the compact, removing burrs, breaking edges, etc. Such post-consolidation processing is very difficult for conventional compact processing approaches, because the green strength of the compact is insufficient to sustain such processing. However, the green strength of the compact prepared by the present approach may, in many instances, be sufficient to permit such processing.

The compact is fired at elevated temperature. The firing treatment typically involves two distinct phases, burnout of the (crosslinked) binder system and stiffening agent at an intermediate temperature, and sintering of the remaining ceramic particle mass at a high temperature. The compact is heated in an atmosphere or vacuum to a burnout temperature and held for a sufficient period of time to permit the organic components to vaporize and be removed from the compact. Again, care is taken that the removal of the volatile components is not too rapid, to prevent adverse effects on the structural integrity of the compact.

The compact then is further heated to the sintering temperature, either directly from the burnout temperature or after an intermediate cooling to ambient temperature. The compact is held at the sintering temperature for a period of time sufficient to permit the desired degree of bonding and densification of the particles, which in turn depends upon the use planned for the final article. After sintering is complete, the article is cooled to ambient temperature, and is ready for use or post-sintering processing, if any.

The burnout and sintering treatments are not significantly affected by the use of the stiffening treatment of the invention. Although the stiffening treatment does change the chemical structure of the binder system, as by crosslinking the binder, the burnout treatment is typically performed at a temperature well in excess of the vaporization temperature of either the non-crosslinked or the crosslinked binder. For example, the burnout treatment for a typical ceramic powder compact is accomplished by heating the compact at a heating rate of 10° C. per hour to a burnout temperature of about 250°-400° C., and holding at that temperature for a burnout time of about 2 hours (which is varied according to the size of the article, longer times being required for thicker sections). Similarly, the sintering treatment is substantially unaffected by the use of the stiffening treatment, because the organic binder system and the stiffening agent are removed by the time that the sintering treatment is performed. A typical sintering treatment for ceramic powders processed as described herein is heating the compact at a heating rate of 100° C. per hour to a sintering temperature of about 1000°-1400° C., and holding at that temperature for a sintering time of about 1 hour. Burnout treatments and sintering treatments for particular powders and binder systems are known to those skilled in the art.

The following examples are intended to illustrate aspects of the invention, and should not be taken as limiting of the invention in any respect.

EXAMPLE 1

A green ceramic material was prepared by mixing about 50 percent by volume of lanthanum manganite powder with a binder system containing equal parts of polyvinyl acetal resin binder and phthalate plasticizer. The material was partially consolidated by rolling into bars having dimensions 0.5 inches wide by 2.5 inches long by 0.055 inches thick. The samples were divided into two groups. One group of samples was treated by immersing the samples overnight in a stiffening solution of 2 percent by volume tolylene 2,4-diisocyanate stiffening agent in hexane. The other group was an untreated control group. The stiffness of the samples was determined by measuring the force required to twist the samples to breaking. Higher degrees of stiffness are indicated by greater forces required to break the sample at a smaller twisted angle from the initial untwisted position. Alternatively stated, a stiffer sample requires higher force to produce the same twisted angle. The results showed that the treated samples broke when twisted to 120 degrees by a force of about 16 pounds. The untreated samples were so flexible and weak that they could be twisted to 360 degrees by a force of only 0.20 pounds without breaking. For a uniform 90 degrees twisted angle, the treated samples required a force of 14 pounds while the untreated samples required only 0.02 pounds. The results indicate the increased stiffness of the samples treated with the diisocyanate solution, demonstrating the operability of the present invention.

EXAMPLE 2

A green ceramic material was prepared by mixing about 50 percent by volume of silicon nitride powder with a binder system containing equal parts of polyvinyl acetal resin binder and phthalate plasticizer. The mixture was partially consolidated into three thin-walled cylinders each of about 1 inch diameter, 0.020 inch wall thickness, and 1 inch height. The three cylinders were treated differently prior to firing. One cylinder was treated with a hexane solution containing 1 weight percent diisocyanate stiffener for 16 hours, and dried. Another cylinder was immersed in hexane solvent having no diisocyanate for 16 hours, and dried. The third cylinder was not treated with any solvent or solution. The three cylinders were fired in a nitrogen atmosphere by heating the cylinders to a temperature of about 550° C. at a heating rate of 10° C. per hour to remove the organic binder. The samples were then cooled to ambient temperature. The cylinder treated with the diisocyanate-hexane solution in accordance with the present invention was observed to retain its shape whereas the other two cylinders collapsed. The results demonstrated the effectiveness of the invention in improving green strength to minimize collapsing and deforming of ceramic compacts during firing.

The present invention therefore provides an important advance in the art of producing articles from powders. Although particular embodiments of the invention have been described in detail for purposes of illustration, various modifications may be made without departing from the spirit and scope of the invention. Accordingly, the invention is not to be limited except as by the appended claims.

What is claimed is:

1. A method for preparing a preform from a powder, comprising the steps of:
    processing to form a partially consolidated mixture of a solid powder and an organic binder system;
    contacting the partially consolidated mixture with a stiffening, liquid solution comprising
        a stiffening agent that effects at least partial cross-linking of the organic binder system, and
        a solvent that dissolves the stiffening agent but not the organic binder system;
    and drying to remove the solvent of the stiffening, liquid solution.

2. The method of claim 1, wherein the binder system is a polyvinyl butyral, and the stiffening agent is selected from the group consisting of a diisocyanate, glyoxal, and 2-methoxy-4-methylphenol.

3. The method of claim 2, wherein the solvent is selected from the group consisting of hexane, toluene, and benzene.

4. The method of claim 1, wherein the binder system is a polyvinyl acetal, and the stiffening agent is selected from the group consisting of a diisocyanate, glyoxal, and 2-methoxy-4-methylphenol.

5. The method of claim 1, wherein the binder system is a polyethylene, and the stiffening agent is a peroxide.

6. The method of claim 1, wherein the binder system is polyvinyl carbonate, and the stiffening agent is a peroxide.

7. The method of claim 1, wherein the binder system is an acrylonitrile-butadiene-styrene material, and the stiffening agent is selected from the group consisting of a polyisocyanate and an N-methylol derivative.

8. The method of claim 1, wherein the solid powder is a ceramic.

9. The method of claim 1, including the additional step, after the step of contacting, of
    firing the partially consolidated mixture.

10. A method for preparing a preform from a powder, comprising the steps of:
    mixing a solid powder with an organic binder system;
    forming a partially consolidated mixture;
    placing the partially consolidated mixture into a stiffening, liquid solution of
        a stiffening agent that reacts with the organic binder system to form a cross-linked organic structure, and
        an organic liquid that dissolves the stiffening agent but not the organic binder system;
    and drying to remove the solvent of the stiffening, liquid solution.

11. The method of claim 10, wherein the solid powder is a ceramic.

12. The method of claim 10, including the additional step, after the step of placing, of
    removing the organic liquid.

13. The method of claim 10, including the additional step, after the step of placing, of
    firing the partially consolidated mixture.

* * * * *